United States Patent
McCauley et al.

(10) Patent No.: US 12,495,202 B1
(45) Date of Patent: Dec. 9, 2025

(54) DELETION OF CONTENT CAPTURED BY AN IMAGE CAPTURE DEVICE

(71) Applicant: GoPro, Inc., San Mateo, CA (US)

(72) Inventors: Grant Adam McCauley, San Mateo, CA (US); Fong Tran, San Mateo, CA (US); Stephen Yui, Oakland, CA (US); Nicholas Woodman, Big Sky, MT (US)

(73) Assignee: GoPro, Inc., San Mateo, CA (US)

( * ) Notice: Subject to any disclaimer, the term of this patent is extended or adjusted under 35 U.S.C. 154(b) by 76 days.

(21) Appl. No.: 18/634,002

(22) Filed: Apr. 12, 2024

Related U.S. Application Data (60) Provisional application No. 63/496,253, filed on Apr. 14, 2023.

(51) Int. Cl.
  *H04N 23/62* (2023.01)
(52) U.S. Cl.
  CPC .................. *H04N 23/62* (2023.01)
(58) Field of Classification Search
  CPC ....................................... H04N 23/62
  USPC ........................................ 348/373
  See application file for complete search history.

(56) References Cited

U.S. PATENT DOCUMENTS

| | | | |
|---|---|---|---|
| 9,742,978 B2* | 8/2017 | Ito .......................... | H04N 23/73 |
| 10,764,446 B2* | 9/2020 | Kasa ...................... | H04N 23/66 |
| 11,165,948 B2* | 11/2021 | Aoba ................... | H04N 23/667 |
| 11,843,854 B2* | 12/2023 | Hoshika ................ | H04N 7/012 |
| 2016/0057357 A1* | 2/2016 | Oka ....................... | H04N 23/62 |
| | | | 348/333.01 |
| 2016/0219210 A1* | 7/2016 | Ito ........................ | H04N 23/663 |
| 2017/0223263 A1* | 8/2017 | Kasa ...................... | H04N 23/73 |
| 2017/0230578 A1* | 8/2017 | Kitaya ................. | H04N 23/667 |
| 2017/0272583 A1* | 9/2017 | Kasa ...................... | H04N 23/663 |
| 2019/0260944 A1* | 8/2019 | Ogawa ................ | H04N 23/633 |
| 2020/0007783 A1* | 1/2020 | Ueguri ................ | H04N 23/673 |
| 2022/0078328 A1* | 3/2022 | Kazama ................ | H04N 23/55 |
| 2022/0247932 A1* | 8/2022 | Hoshika ................ | H04N 7/012 |

* cited by examiner

*Primary Examiner* — Pritham D Prabhakher
(74) *Attorney, Agent, or Firm* — Esplin & Associates, PC (57) ABSTRACT

An image capture device may start capture of visual content (start video recording) responsive to a particular user interaction with a button of the image capture device. During the capture of the visual content, a different user interaction with the button of the image capture device may be detected. Responsive to the different user interaction with the button of the image capture device, the capture of the visual content may be canceled by the image capture device.

20 Claims, 6 Drawing Sheets

DELETION OF CONTENT CAPTURED BY AN IMAGE CAPTURE DEVICE

FIELD

This disclosure relates to deleting content captured by an image capture device.

BACKGROUND

A user may use an image capture device to capture content (e.g., visual content, audio content). During capture of the content, the user may decide to not keep the content being captured. Requiring the user to delete the content after finishing capture may be cumbersome.

SUMMARY

This disclosure relates to deleting content captured by an image capture device. An image capture device may include a housing. The housing may carry one or more of an optical element, an image sensor, non-transitory, machine-readable storage media, a shutter button, and/or other components. The optical element may guide light within a field of view to the image sensor. The image sensor may generate a visual output signal conveying visual information defining visual content based on light that becomes incident thereon. The non-transitory, machine-readable storage media may store information. The shutter button may be interacted upon by a user.

A user interaction of a first type with the shutter button may be detected. Responsive to the user interaction of the first type with the shutter button, capture of the visual content may be started. A user interaction of a second type with the shutter button may be detected during the capture of the visual content. The user interaction of the second type may be different from the user interaction of the first type. Responsive to the user interaction of the second type with the shutter button during the capture of the visual content, the capture of the visual content may be canceled.

A housing may carry one or more components of an image capture device. The housing may carry (be attached to, support, hold, and/or otherwise carry) one or more of an electronic storage, an optical element, an image sensor, a shutter button, a processor, and/or other components.

The electronic storage may store information relating to the image capture device, information relating to components of the image capture device, visual information, information relating to capture of content by the image capture device, information relating to visual content captured by the image capture device, information relating to other content captured by the image capture device, information relating to user interaction with the image capture device, information relating to cancellation of capture of content by the image capture device, and/or other information. The electronic storage may include non-transitory, machine-readable storage media. The non-transitory, machine-readable storage media may be configured to store information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The shutter button may be configured to be interacted upon by a user of the image capture device. The shutter button may be configured to be interacted upon by the user during capture of content by the image capture device.

The processor(s) may be configured by machine-readable instructions. Executing the machine-readable instructions may cause the processor(s) to facilitate deleting captured content. The machine-readable instructions may include one or more computer program components. The computer program components may include one or more of a user interaction component, a content capture component, a cancel component, and/or other computer program components.

The user interaction component may be configured to detect one or more user interactions with the image capture device. The user interaction component may be configured to user interaction(s) with the shutter button, other buttons, and/or other user interface components of the image capture device. The user interaction component may be configured to detect types of user interaction with the image capture device. The user interaction component may be configured to detect types of user interaction with the shutter button, other buttons, and/or other user interface components of the image capture device.

For example, the user interaction component may be configured to detect a user interaction of a first type with the shutter button. The user interaction component may be configured to detect a user interaction of a second type with the shutter button. The user interaction of the second type may be different from the user interaction of the first type. The user interaction of the second type with the shutter button may be detected during the capture of the visual content. In some implementations, the user interaction component may be configured to detect a user interaction of a third type with the shutter button. The user interaction of the third type with the shutter button may be detected after the capture of the visual content and/or other content.

The content capture component may be configured to start capture of the visual content and/or other content by the image capture device. Responsive to the user interaction of the first type with the shutter button, the content capture component may be configured to start capture of the visual content and/or other content by the image capture device.

The cancel component may be configured to cancel the capture of the visual content and/or other content by the image capture device. Responsive to the user interaction of the second type with the shutter button during the capture of the visual content and/or other content, the cancel component may be configured to cancel the capture of the visual content and/or other content by the image capture device.

In some implementations, the user interaction of the first type with the shutter button that starts the capture of the visual content and/or other content may include a short-press of the shutter button, and the user interaction of the second type with the shutter button during the capture of the visual content that cancels the capture of the visual content and/or other content may include a long-press of the shutter button.

In some implementations, the user interaction of the first type with the shutter button that starts the capture of the visual content and/or other content may include a single-press of the shutter button, and the user interaction of the second type with the shutter button during the capture of the visual content that cancels the capture of the visual content and/or other content may include a multi-press of the shutter button.

In some implementations, cancellation of the capture of the visual content and/or other content may include: (1) stopping the capture of the visual content and/or other content, and (2) deleting the captured visual content and/or other captured content that has been stored in the non-transitory, machine-readable storage media.

In some implementations, the captured visual content and/or other captured content may be stored in the non-transitory, machine-readable storage media. Responsive to the user interaction of the third type with the shutter button after the capture of the visual content and/or other content, the captured visual content and/or other captured content may be deleted from the non-transitory, machine-readable storage media. In some implementations, the captured visual content and/or other captured content may be deleted from the non-transitory, machine-readable storage media further based on the user interaction of the third type with the shutter button after the capture of the visual content being detected within a threshold duration of time after the capture of the visual content.

In some implementations, responsive to the user interaction of the first type with the shutter button that starts the capture of the visual content and/or other content being detected when the image capture device is deactivated, the image capture device may be activated to start the capture of the visual content and/or other content. In some implementations, the image capture device being deactivated may include the image capture device being turned off or being in a standby mode.

Responsive to the user interaction of the second type with the shutter button during the capture of the visual content that cancels the capture of the visual content and/or other content being detected following the user interaction of the first type with the shutter button that starts the capture of the visual content and/or other content when the image capture device is deactivated, the image capture device may be deactivated after the capture of the visual content and/or other content is canceled.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
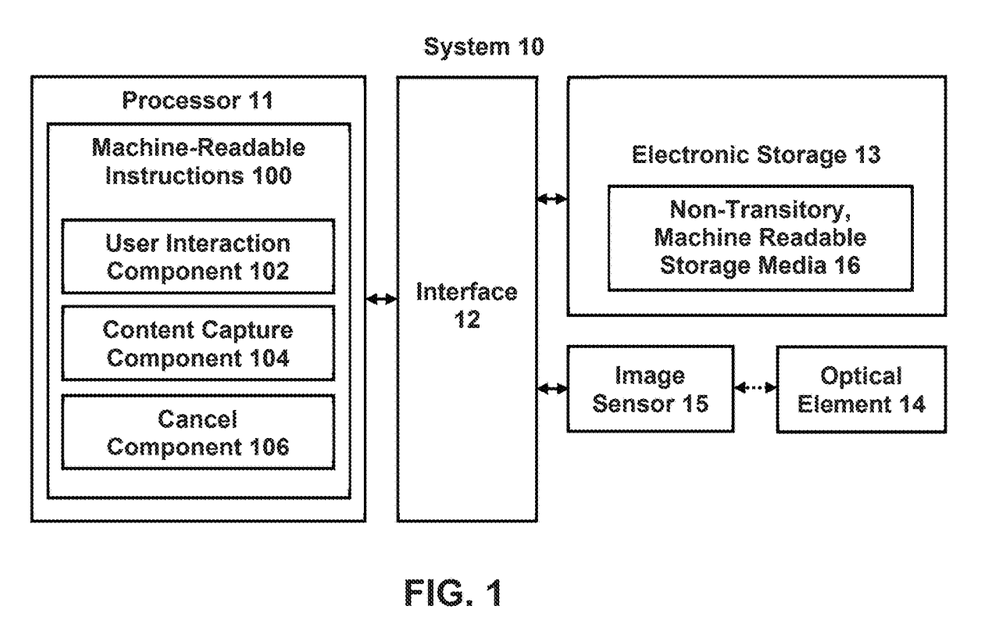
FIG. 1 illustrates an example system for deleting content captured by an image capture device.

FIG. 1 illustrates a system 10 for deleting content captured by an image capture device. The system 10 may include one or more of a processor 11, an interface 12 (e.g., bus, wireless interface), an electronic storage 13, an optical element 14, an image sensor 15, and/or other components. The electronic storage 13 may include non-transitory, machine-readable storage media 16. The non-transitory, machine-readable storage media 16 may be configured to store information. The system 10 may include and/or be part of an image capture device. The image capture device may include a housing, and one or more of the electronic storage 13, optical element 14, the image sensor 15, and/or other components of the system 10 may be carried by the housing of the image capture device. The housing may carry a shutter button and/or other buttons. The optical element 14 may guide light within a field of view to the image sensor 15. The image sensor 15 may generate a visual output signal conveying visual information defining visual content based on light that becomes incident thereon. The shutter button may be configured to be interacted upon by a user.

A user interaction of a first type with the shutter button may be detected by the processor 11. Responsive to the user interaction of the first type with the shutter button, capture of the visual content may be started by the processor 11. A user interaction of a second type with the shutter button may be detected during the capture of the visual content by the processor 11. The user interaction of the second type may be different from the user interaction of the first type. Responsive to the user interaction of the second type with the shutter button during the capture of the visual content, the capture of the visual content may be canceled by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to capture of content by the image capture device, information relating to visual content captured by the image capture device, information relating to other content captured by the image capture device, information relating to user interaction with the image capture device, information relating to cancellation of capture of content by the image capture device, and/or other information. The electronic storage may include non-transitory, machine-readable storage media.

the electronic storage 13 may include non-transitory, machine-readable storage media 16. The non-transitory machine-readable storage media 16 may include one or more different types of non-transitory computer-readable media. The non-transitory machine-readable storage media 16 may include permanent memory and/or temporary memory. The non-transitory, machine-readable storage media 16 may be configured to store information. For example, the non-transitory, machine-readable storage media 16 may store information defining content being captured by the image capture device. The non-transitory, machine-readable storage media 16 may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

The sound(s) within the audio content may correspond to the sound(s) that were captured when capturing the visual content. For example, the visual content may include a visual capture of an activity involving one or more persons and the audio content may include sound capture of the activity, which may include sounds produced by persons or non-persons (e.g., animals, machines, objects). One or more portions of the audio content may include capture of voice of one or more persons and/or other sounds. Voice may refer to vocal sounds made by a person. Voice may be directed to one or more persons or one or more non-persons. Voice may include part of a spoken word/sound, one or more spoken words/sounds, and/or other vocal sounds. For example, voice may include speech, singing, shouting, cheering, yelling, screaming, booing, and/or other voice.

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, and/or the image sensor 15, of the system 10 may be carried by the housing of the image capture device. The housing of the image capture device may carry other components of the system 10, such as the processor 11. References to a housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3:
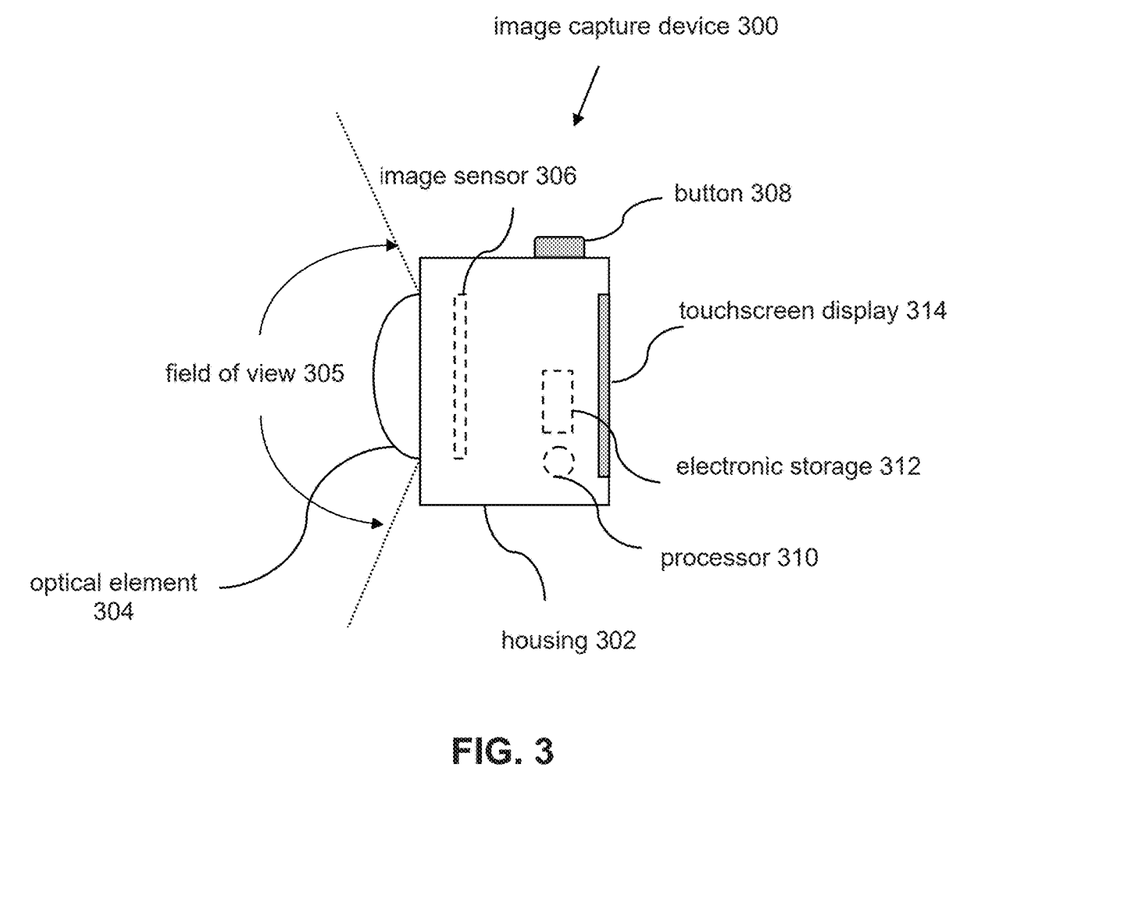
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, a button 308, a processor 310, an electronic storage 312, a touchscreen display 314, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The electronic storage 312 may be the same as, be similar to, and/or correspond to the electronic storage 13. The image capture device 300 may include other components not shown in FIG. 3. The image capture device 300 may not include one or more components shown in FIG. 3. For example, the image capture device 300 may not include any displays or may include a non-touchscreen display rather than the touchscreen display 314. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors (e.g., microphones) to capture audio content, one or more location sensors (e.g., GPS sensors) to measure location of the image capture device, one or more position sensors (e.g., gyroscope, accelerometer, inertial measurement unit) to measure position, movement, and/or orientation of the image capture device, and/or other sensors. In some implementations, information about location, position, and/or movement of the image capture device may be stored as metadata of other content (e.g., visual content, audio content) captured by the image capture device.

The button 308 may refer to one or more physical mechanisms that may be physically interacted upon by a user. The button 308 may be interacted upon by a user to operate the button 308 and provide one or more commands to the image capture device 300. For example, a user may interact with the button 308 to provide one or more commands to the image capture device 300 to start content capture, to stop content capture, to cancel content capture, and/or to otherwise operate the image capture device 300. In some implementations, the button 308 may be a shutter button. The shutter button may refer to a button used to capture (e.g., record/take) images, videos, and/or other content. In some implementations, the button 308 may be other button, such as power button, special mode button, mode switch button, quick capture button, setting button, and/or other button. In some implementations, the button 308 may include a dedicated button with the user interaction of the button 308 causing specific operation/functionality (e.g., start/stop record, power on/off). In some implementations, the button 308 may include a multi-purpose button with the user interaction of the button 308 causing different operations/functionalities (e.g., based on different context in which the image capture device 300 is operating, based on user specifying the use of the button 308).

The button 308 may be configured to be interacted upon by a user of the image capture device. The button 308 may be configured to be interacted upon by the user before, during, and/or after capture of content by the image capture device. The button 308 may be configured to receive different types of user interaction. A type of user interaction may refer to a category, a way, a form, and/or kind of user interaction. A type of user interaction may be defined by different physical interactions of the user with the button 308 (e.g., press, pull, twist, flip, click, press-and-hold), different timing of physical interaction of the user with the button 308 (e.g., a short-press, a long press, user interaction before content capture, user interaction during content capture, user interaction after content capture), and/or other user interaction with the button 308.

While a single physical button is shown in FIG. 3, this is merely as an example and is not meant to be limiting. In some implementations, the image capture device may include multiple physical buttons. In some implementations, the function of the button 308 may be performed by a virtual button presented on the touchscreen display 314. Other types and/or configurations of buttons are contemplated.

The touchscreen display 314 may include an electronic device that provides visual presentation of information. The touchscreen display 314 may include a color display and/or a non-color display. The touchscreen display 314 may be configured to visually present information. The touchscreen display 314 may be configured to present visual content, user interface, and/or other information. User interface (graphical user interface) may include a graphical form that enables a user to interact with the image capture device 300 and/or see information provided by the image capture device 300. A button presented on the touchscreen display 314 may be referred to as a virtual button.

The touchscreen display 314 may be configured to receive user input via a user's engagement with the touchscreen display 314. A user may engage with the touchscreen display 314 via interaction with one or more touch-sensitive surfaces/screens and/or other components of the touchscreen display. The touchscreen display 314 may be configured to receive user input to change the operation of the image capture device (e.g., change setting, start recording, stop recording, cancel recording). For example, the touchscreen display 314 may present one or more options for a user to provide input to the image capture device 300, such as by presenting one or more virtual (soft) buttons. The user may change the operation of the image capture device 300 by engaging one or more fingers on the location of the touchscreen display 314 corresponding to the virtual button(s). The touchscreen display 314 may be configured to generate output signals indicating location of the user's engagement with the touchscreen display 314. User input (to change operation of the image capture device) may be received/determined based on the output signals generated by the touchscreen display 314.

The touchscreen display 314 may include one or more touch-sensitive screens and/or other components. A user may engage with the touchscreen display 314 by touching one or more portions of a touch-sensitive screen (e.g., with one or more fingers, stylus). A user may engage with the touchscreen display 314 at a moment in time, at multiple moments in time, during a period, and/or during multiple periods. For example, a user may tap on, hold, or move along the touchscreen display 314 to provide input to the image capture device. For example, a user may tap on and/or hold a finger on a portion of the touchscreen display 314 corresponding to a virtual button to provide input to the image capture device.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The processor 310 may detect user interaction with the button 308 and/or other buttons of the image capture device 300. The processor 310 may determine different types of user interaction with the button 308 and/or other buttons of the image capture device 300. Based on the type of user interaction with the button 308 and/or other buttons, the processor 310 may operate the image capture device 300. Based on different types of user interaction with the button 308 and/or other buttons, the processor 310 may operate the image capture device 300 differently.

For example, based on one type of user interaction with the button 308, the processor 310 may start capture of content (e.g., visual content, audio content, metadata, etc.) by the image capture device 300. For instance, based on a short-press or a single press of the button 308, the processor 310 may start capture of content by the image capture device 300. Based on another type of user interaction with the button 308, the processor may cancel the capture of content by the image capture device 300. For instance, based on a long-press or a multi-press of the button 308 during content capture by the image capture device 300, the processor 310 may cancel capture of content by the image capture device 300.

For example, the user may decide that the content being captured by the image capture device 300 should not be kept. Rather than requiring the user to finish content capture, review the captured content, and manually delete the captured content, the user may interact with the button 308 to cancel the content capture. Canceling the content capture may result in interruption of content capture such that content capture does not finish. For example, canceling the content capture may cause the image capture device 300 to stop capture of content and delete any captured content has been stored in the electronic storage 312 (e.g., stop recording and delete any buffered and/or encoded content). Canceling the content capture may result in the content captured being finished and automatic removal of any resulting content. For example, canceling the content capture may cause the image capture device 300 to finish capture of content, store captured content in the electronic storage 312, and automatically deleted the stored content from the electronic storage 312 (e.g., finish recording and delete content that was recorded).

As another example, the user may decide that the last content captured by the image capture device 300 should not be kept. Rather than requiring the user to review the captured content and manually deleted the captured content, the user may interact with the button 308 to delete the last captured content. For instance, based on a long-press or a multi-press of the button 308 after content capture by the image capture device, the processor 310 may delete the last content captured by the image capture device 300 from the electronic storage 312. In some implementations, the user interaction with the image capture device 300 to delete the last content captured by the image capture device 300 may need to be detected within a threshold duration of time after the last content was captured. For example, the user interaction with the button 308 to delete the last content captured by the image capture device 300 may need to be detected within five seconds of the capture being completed. Other threshold durations of time are contemplated.

Such cancellation of content capture and/or deletion of captured content may enable the user to remove content from the image capture device 300/electronic storage 312 without having to review the content. In some implementations, the image capture device 300 may visually, audibly, and/or haptically indicate cancellation of content capture and/or deletion of captured content to the user. For example, cancellation of content capture and/or deletion of captured content may be visually indicated by one or more text/images presented on the touchscreen display 314 and/or one or more lights of the image capture device 300 being turned on (e.g., steady or blinking LED on the image capture device 300, color of LED on the image capture device 300). Cancellation of content capture and/or deletion of captured content may be audibly indicated by sound produced via one or more speakers of the image capture device 300 (e.g., cancellation and/or deletion message, beeping sound). Cancellation of content capture and/or deletion of captured content may be haptically indicated by vibration of the image capture device 300. Other indications are contemplated.

In some implementations, cancellation of content capture may cause the image capture device 300 to revert to its prior state before content capture was started. For example, the image capture device 300 may have been turned off or in a standby mode when user interaction with the button 308 to start content capture was detected. Responsive to the user interaction with the button 308 to start content capture, the image capture device 300 may have been turned on or brought into active mode before starting content capture. Responsive to the user interaction with the button 308 to cancel content capture being detected, the image capture device 300 may cancel content capture and automatically turn itself off or go into the standby mode. If the image capture device 300 was in active mode when user interaction with the button 308 to start content capture was detected, the image capture device 300 may cancel content capture and return to active mode when the user interaction with the button 308 to cancel content capture is detected.

In some implementations, the use of the button 308 to cancel content capture and/or delete last captured content may be enabled based on setting of the image capture device 300, operation of the image capture device 300, and/or other information. For example, whether or not the button 308 can be used to cancel content capture and/or delete last captured content may be determined based on whether a particular option in the setting has been turned on or off. The use of the button 308 to cancel content capture and/or delete last captured content may be enabled based on the touchscreen display 314 being deactivated (e.g., locked, turned off). The use of the button 308 to cancel content capture and/or delete last captured content may be enabled based on the image capture device 300 being mounted in one or more positions (e.g., positioned on a person's head or chest such that the touchscreen display 314 is inaccessible).

Referring back to FIG. 1, the processor 11 (or one or more components of the processor 11) may be configured to obtain information to facilitate deleting content captured by an image capture device. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate deleting content captured by an image capture device. The machine-readable instructions 100 may include one or more computer program components. The machine-readable instructions 100 may include one or more of a user interaction component 102, a content capture component 104, a cancel component 106, and/or other computer program components.

The user interaction component 102 may be configured to detect one or more user interactions with an image capture device. Detecting a user interaction with an image capture device may include one or more of determining, discerning, discovering, finding, identifying, spotting, and/or otherwise detecting the user interaction with the image capture device. The user interaction component 102 may be configured to user interaction(s) with the shutter button, other buttons (e.g., physical button, virtual button), and/or other user interface components of the image capture device.

Detecting a user interaction with the image capture device may include detecting types of user interaction with the image capture device. The user interaction component 102 may be configured to detect types of user interaction with the image capture device. Detecting types of user interaction with the image capture device may include one or more of determining, discerning, discovering, finding, identifying, spotting, and/or otherwise detecting the types of user interaction with the image capture device. The user interaction component 102 may be configured to detect types of user interaction with the shutter button, other buttons, and/or other user interface components of the image capture device.

The user interaction component 102 may be configured to detect user interactions of different types with the shutter button, other buttons, and/or other user interface components of the image capture device. For example, the user interaction component 102 may be configured to detect user interaction of one type to start capture of content by the image capture device, detect user interaction of another type during capture of content by the image capture device to cancel content capture by the image capture device, and/or detect user interaction of other types during other times. The user interaction component 102 may be configured to detect user interaction of one type after content capture has finished to delete the last captured content. Detection of other types of user interaction at other times is contemplated.

For example, the user interaction component 102 may be configured to detect a user interaction of a first type with the shutter button. The user interaction component 102 may be configured to detect a user interaction of a second type with the shutter button. The user interaction of the second type may be different from the user interaction of the first type. The user interaction of the second type with the shutter button may be detected during the capture of content (e.g., visual content, audio content, metadata) by the image capture device. The user interaction component 102 may be configured to detect a user interaction of a third type with the shutter button. The user interaction of the third type with the shutter button may be detected after the capture of content by the image capture device.

The content capture component 104 may be configured to start capture of content by the image capture device. Capture of content by the image capture device may include capture of visual content, audio content, metadata, and/or other content by the image capture device. The capture of content by the image capture device may be started by the content capture component 104 responsive to the user interaction of a particular type with the image capture device (e.g., user interaction of the first type with the shutter button)

Capturing content may include using, recording, storing, and/or otherwise capturing the content. The content may be captured during a capture duration. For instance, visual content, audio content, and/or metadata may be captured while the image capture device is operating in a record mode. The visual content may be captured for use in generating images and/or video frames, the audio content may be captured to provide audio/sound for the images and/or the video frames, and the metadata may be captured to provide information about the visual content and/or the audio content.

For example, during a capture duration, the content capture component 104 may use the visual output signal generated by the image sensor 15 and/or the visual information conveyed by the visual output signal to record, store, and/or otherwise capture the visual content. For instance, the content capture component 104 may store, in the electronic storage 13/non-transitory machine-readable storage media 16 and/or other (permanent and/or temporary) electronic storage media, information (e.g., the visual information) defining the visual content based on the visual output signal generated by the image sensor 15 and/or the visual information conveyed by the visual output signal during the capture duration. In some implementations, information defining the captured visual content may be stored in one or more visual tracks. The content capture component 104 may use output signals generated by other sensors (e.g., sound sensor, location sensor, position sensor, etc.) and/or information conveyed by other output signal to record, store, and/or otherwise capture other content (e.g., audio content, metadata). Other content may be stored in the electronic storage 13/non-transitory machine-readable storage media 16 and/or other (permanent and/or temporary) electronic storage media.

The cancel component 106 may be configured to cancel the capture of content by the image capture device. The cancel component 106 may be configured to cancel the capture of visual content, audio content, metadata, and/or other content by the image capture device. The capture of content by the image capture device may be canceled by the cancel component 106 responsive to the user interaction of a particular type with the image capture device during the capture of content by the image capture device (e.g., user interaction of the second type with the shutter button during the capture of content).

Canceling content capture may include stopping or terminating capture of content by the image capture device, preventing capture of content by the image capture device from continuing, and/or otherwise canceling the content capture. For instance, the operation of the image capture device may be changed from operating in the record mode to not operating in the record mode.

In some implementations, the user interaction of the first type with a button (e.g., shutter button, other physical and/or virtual button) that starts the capture of content may include a short-press of the button, and the user interaction of the second type with the button during the capture of content that cancels the capture of content may include a long-press of the button. The short-press of the button may include a momentary press of the button (e.g., click of the button). The short-press of the button may include the user pressing the button for less than a threshold duration of time. The long-press of the button may include a press and hold of the button. The long-press of the button may include the user pressing the button and holding the button down for more than a threshold duration of time (e.g., more than three seconds). The same threshold duration of time may be used for the short-press of the button and the long-press of the button. Different threshold durations of time may be used for the short-press of the button and the long-press of the button.

In some implementations, the user interaction of the first type with the button that starts the capture of content may include a single-press of the button, and the user interaction of the second type with the button during the capture of content that cancels the capture of content may include a multi-press of the button. The single-press of the button may include the user pressing the button once over a threshold duration of time. The multi-press of the button may include the user pressing the button multiple times (e.g., twice, three times, etc.) over the threshold duration of time. Other types of user interaction with the image capture device to start and cancel capture of content are contemplated.

In some implementations, cancellation of the capture of content may include: (1) stopping the capture of content, and (2) deleting captured content that has been stored in the electronic storage 13/non-transitory, machine-readable storage media 16. For example, the capture of content may be interrupted to prevent storage of content and any captured content that has been stored may be deleted.

In some implementations, cancellation of the capture of content may include: (1) finishing the capture of content, and (2) automatically deleting content stored from the capture of content being finished. For example, the capture of content may be finished and captured content may be stored in the electronic storage 13/non-transitory, machine-readable storage media 16. The stored content may be automatically deleted from the electronic storage 13/non-transitory, machine-readable storage media 16.

In some implementations, the captured content (e.g., visual content, audio content, metadata) may be stored in the electronic storage 13/non-transitory, machine-readable storage media 16. Responsive to the user interaction of a particular type with the button after the capture of content, the captured content may be deleted from the electronic storage 13/non-transitory, machine-readable storage media 16. For example, after the image capture device has finished recording the content, the user may interact with the button in a particular way (e.g., hold the button down for three or more seconds). Responsive to this user interaction with the button, the content that was captured last (e.g., last recorded image/video) may be deleted from memory.

In some implementations, the captured content may be deleted from the electronic storage 13/non-transitory, machine-readable storage media 16 further based on the user interaction of the particular type with the button after the capture of content being detected within a threshold duration of time after the capture of the content. For example, the user may need to interact with the button in the particular way (e.g., hold the button down for three or more seconds) within a certain amount of time after the recording has finished for the last captured content to be deleted from memory.

In some implementations, one or more notifications may be provided to the user that content capture may be canceled/last captured content may be deleted. A notification may be provided visually (e.g., presented on a display, such as the touchscreen display 314) and/or audibly (e.g., sound produced on a speaker). A notification may be provided before content capture cancellation/last captured content deletion is performed. A notification may be provided while the user interaction to initiate content capture cancellation/last captured content deletion is being received. A notification may be provided during content capture cancellation/last captured content deletion. For example, the user may need to hold down a button for a first threshold duration of time (e.g., 3 seconds) to initiate content capture cancellation/last captured content deletion. The user holding down the button for a second duration of time shorter than the first duration of time (e.g., 0.5 second) may indicate that the user is interacting with the button to initiate content capture cancellation/last captured content deletion. Responsive to the user holding down the button for the second duration of time, a notification may be presented on the display that content capture will be canceled/last captured content will be deleted. The notification may include a countdown of the amount of time that user needs to hold the button down (e.g., a countdown for remaining 2.5 seconds). The notification may indicate to the user that content capture cancellation/last captured content deletion will be performed if the user continues holding down the button. If the user stops holding down the button before the second threshold duration of time is reached, content capture cancellation/last captured content deletion may not be performed. If the user holds down button for the second threshold duration of time, content capture cancellation/last captured content deletion may be performed. During content capture cancellation/last captured content deletion, a notification may be provided to indicate to the user that content capture cancellation/last captured content deletion is being performed.

In some implementations, the image capture device may be activated responsive to the user interaction with the image capture device that start the capture of content. For example, the user interaction of the first type with the button that starts the capture of content may be detected when the image capture device is deactivated. In some implementations, the image capture device being deactivated may include the image capture device being turned off or being in a standby mode. Responsive to the user interaction with the image capture device to start the capture of content, the image capture device may be activated to start the capture of content.

In some implementations, the image capture device may return to its prior state after the capture of content is canceled. For example, the image capture device may have been deactivated (e.g., turned off, in standby mode) when the user interaction of the first type with the button that starts the capture of content is detected. The image capture device may be activated to start capture of content. During the capture of content, the user interaction of the second type with the button that cancels the capture of content may be detected. Because the image capture device was deactivated when the user interaction of the first type to start the capture of content was detected, the image capture device may return to being deactivated (e.g., turned off, in standby mode) after the capture of content is canceled.

Figure 4A:
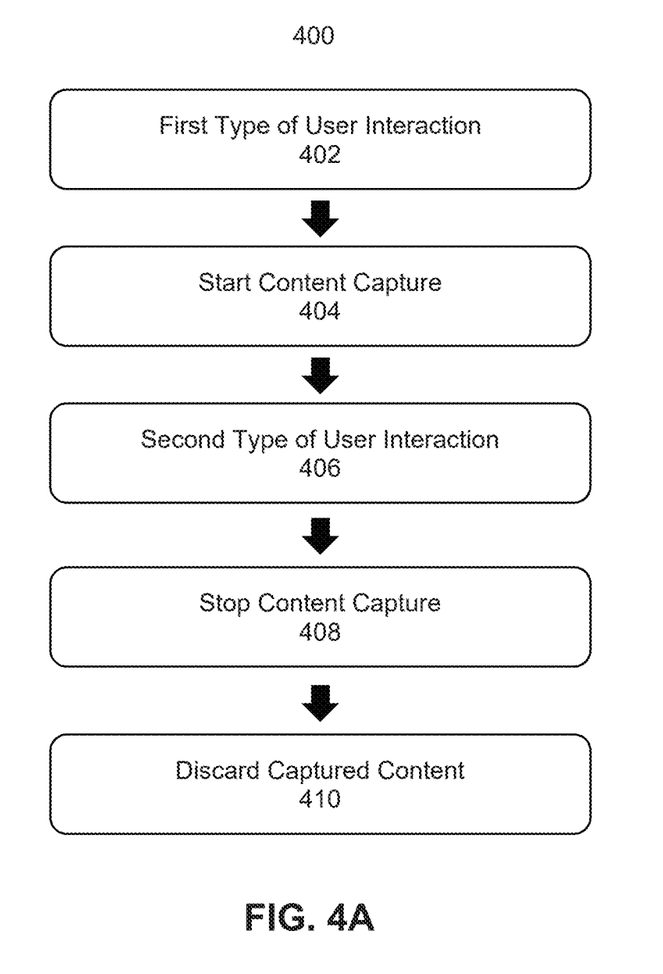
FIG. 4A illustrates an example process for deleting content captured by an image capture device.

FIG. 4A illustrates an example process 400 for deleting content captured by an image capture device. At step 402, first type of user interaction with the image capture device may be detected. At step 404, responsive to the first type of user interaction with the image capture device, content capture may be started. At step 406, during content capture by the image capture device, second type of user interaction with the image capture device may be detected. At step 408, responsive to the second type of user interaction with the image capture device, content capture may be stopped. At step 410, captured content may be discarded (e.g., delete any captured content stored in a buffer).

Figure 4B:
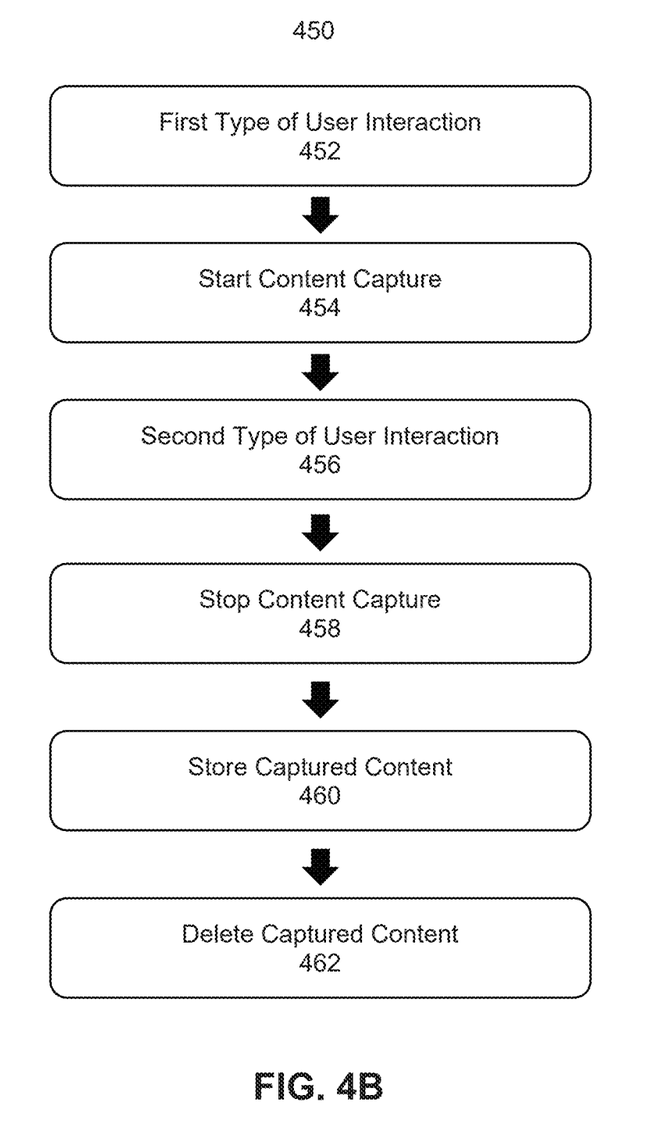
FIG. 4B illustrates an example process for deleting content captured by an image capture device.

FIG. 4B illustrates an example process 450 for deleting content captured by an image capture device. At step 452, first type of user interaction with the image capture device may be detected. At step 454, responsive to the first type of user interaction with the image capture device, content capture may be started. At step 456, during content capture by the image capture device, second type of user interaction with the image capture device may be detected. At step 458, responsive to the second type of user interaction with the image capture device, content capture may be stopped. At step 460, captured content may be stored in memory. At step 462, captured content stored in memory may be deleted (e.g., deleted recorded content).

Figure 5:
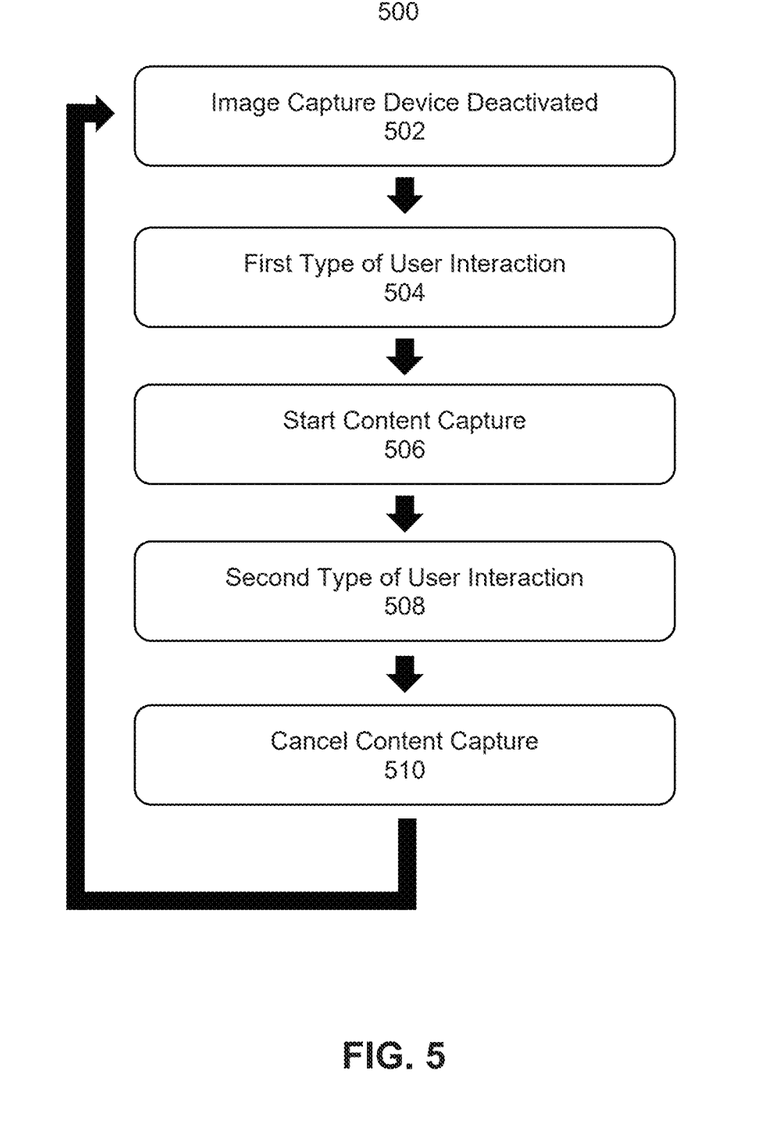
FIG. 5 illustrates an example process for deleting content captured by an image capture device.

FIG. 5 illustrates an example process for deleting content captured by an image capture device. At step 502, the image capture device may be deactivated (e.g., turned off, in standby mode). At step 504, first type of user interaction with the image capture device may be detected. At step 506, responsive to the first type of user interaction with the image capture device, content capture may be started. At step 508, during content capture by the image capture device, second type of user interaction with the image capture device may be detected. At step 510, responsive to the second type of user interaction with the image capture device, content capture may be canceled. After content capture is canceled, the image capture device may return to being deactivated (step 502).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13 and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
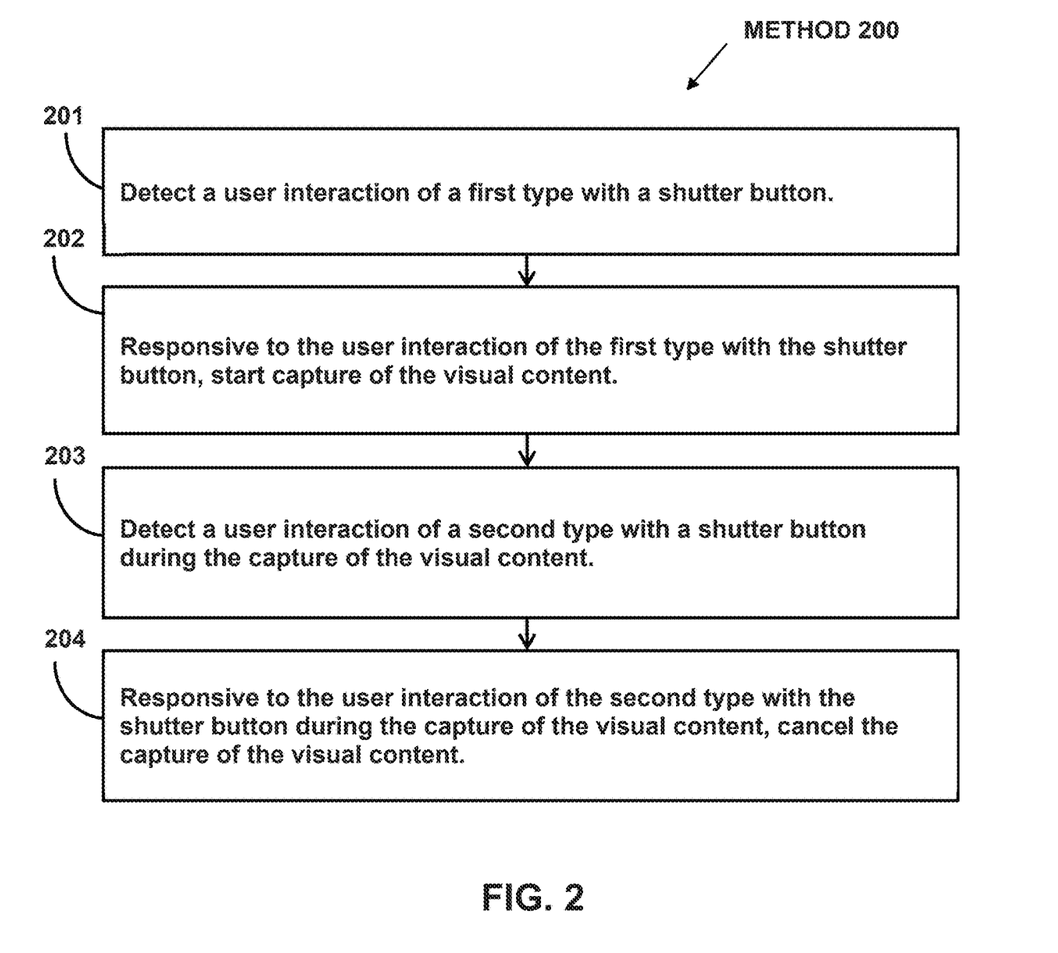
FIG. 2 illustrates an example method for deleting content captured by an image capture device.

FIG. 2 illustrates method 200 for deleting content captured by an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, non-transitory, machine-readable storage media, a shutter button, and/or other components. The optical element may guide light within a field of view to the image sensor. The image sensor may generate a visual output signal conveying visual information defining visual content based on light that becomes incident thereon. The non-transitory, machine-readable storage media may store information. The shutter button may be interacted upon by a user.

At operation 201, a user interaction of a first type with the shutter button may be detected. In some implementation, operation 201 may be performed by a processor component the same as or similar to the user interaction component 102 (Shown in FIG. 1 and described herein).

At operation 202, responsive to the user interaction of the first type with the shutter button, capture of the visual content may be started. In some implementations, operation 202 may be performed by a processor component the same as or similar to the content capture component 104 (Shown in FIG. 1 and described herein).

At operation 203, a user interaction of a second type with the shutter button may be detected during the capture of the visual content. The user interaction of the second type may be different from the user interaction of the first type. In some implementations, operation 203 may be performed by a processor component the same as or similar to the user interaction component 102 (Shown in FIG. 1 and described herein).

At operation 204, responsive to the user interaction of the second type with the shutter button during the capture of the visual content, the capture of the visual content may be canceled. In some implementations, operation 204 may be performed by a processor component the same as or similar to the cancel component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for deleting captured content, the image capture device comprising:
 a housing;
 an optical element carried by the housing and configured to guide light within a field of view to an image sensor;
 the image sensor carried by the housing and configured to generate a visual output signal conveying visual information based on light that becomes incident thereon, the visual information defining visual content having the field of view;
 non-transitory, machine-readable storage media carried by the housing and configured to store information;
 a shutter button carried by the housing and configured to be interacted upon by a user; and
 one or more physical processors configured by machine-readable instructions to:
  detect a user interaction of a first type with the shutter button, the user interaction of the first type with the shutter button including a short-press or a single-press of the shutter button;
  responsive to the user interaction of the first type with the shutter button, start capture of the visual content;
  detect a user interaction of a second type with the shutter button during the capture of the visual content, the user interaction of the second type different from the user interaction of the first type, the user interaction of the second type with the shutter button including a long-press or a multi-press of the shutter button; and
  responsive to the user interaction of the second type with the shutter button during the capture of the visual content, cancel the capture of the visual content.

2. The image capture device of claim 1, wherein:
 responsive to the user interaction of the first type with the shutter button that starts the capture of the visual content being detected when the image capture device is deactivated, the image capture device is activated to start the capture of the visual content; and
 responsive to the user interaction of the second type with the shutter button during the capture of the visual content that cancels the capture of the visual content being detected following the user interaction of the first type with the shutter button that starts the capture of the visual content when the image capture device is deactivated, the image capture device is deactivated after the capture of the visual content is canceled.

3. An image capture device for deleting captured content, the image capture device comprising:
 a housing;
 an optical element carried by the housing and configured to guide light within a field of view to an image sensor;
 the image sensor carried by the housing and configured to generate a visual output signal conveying visual information based on light that becomes incident thereon, the visual information defining visual content having the field of view;
 non-transitory, machine-readable storage media carried by the housing and configured to store information;
 a shutter button carried by the housing and configured to be interacted upon by a user; and
 one or more physical processors configured by machine-readable instructions to:
  detect a user interaction of a first type with the shutter button;
  responsive to the user interaction of the first type with the shutter button, start capture of the visual content;
  detect a user interaction of a second type with the shutter button during the capture of the visual content, the user interaction of the second type different from the user interaction of the first type; and
  responsive to the user interaction of the second type with the shutter button during the capture of the visual content, cancel the capture of the visual content.

4. The image capture device of claim 3, wherein:
 the captured visual content is stored in the non-transitory, machine-readable storage media; and
 the one or more physical processors are further configured by the machine-readable instructions to:
  detect a user interaction of a third type with the shutter button after the capture of the visual content;
  responsive to the user interaction of the third type with the shutter button after the capture of the visual content, delete the captured visual content from the non-transitory, machine-readable storage media.

5. The image capture device of claim 4, wherein the captured visual content is deleted from the non-transitory, machine-readable storage media further based on the user interaction of the third type with the shutter button after the capture of the visual content being detected within a threshold duration of time after the capture of the visual content.

6. The image capture device of claim 3, wherein:
the user interaction of the first type with the shutter button that starts the capture of the visual content includes a short-press of the shutter button; and
the user interaction of the second type with the shutter button during the capture of the visual content that cancels the capture of the visual content includes a long-press of the shutter button.

7. The image capture device of claim 3, wherein:
the user interaction of the first type with the shutter button that starts the capture of the visual content includes a single-press of the shutter button; and
the user interaction of the second type with the shutter button during the capture of the visual content that cancels the capture of the visual content includes a multi-press of the shutter button.

8. The image capture device of claim 3 wherein the one or more physical processors are, to cancel the capture of the visual content, further configured by the machine-readable instructions to:
stop the capture of the visual content; and
delete the captured visual content that has been stored in the non-transitory, machine-readable storage media.

9. The image capture device of claim 3, wherein responsive to the user interaction of the first type with the shutter button that starts the capture of the visual content being detected when the image capture device is deactivated, the image capture device is activated to start the capture of the visual content.

10. The image capture device of claim 9, wherein the image capture device being deactivated includes the image capture device being turned off or being in a standby mode.

11. The image capture device of claim 9, wherein responsive to the user interaction of the second type with the shutter button during the capture of the visual content that cancels the capture of the visual content being detected following the user interaction of the first type with the shutter button that starts the capture of the visual content when the image capture device is deactivated, the image capture device is deactivated after the capture of the visual content is canceled.

12. A method for deleting captured content, the method performed by an image capture device including an optical element, an image sensor, non-transitory, machine-readable storage media, a shutter button, and one or more processors, the optical element configured to guide light within a field of view to the image sensor, the image sensor configured to generate a visual output signal conveying visual information based on light that becomes incident thereon, the visual information defining visual content having the field of view, the non-transitory, machine-readable storage media configured to store information, the shutter button configured to be interacted upon by a user, the method comprising:
detecting a user interaction of a first type with the shutter button;
responsive to the user interaction of the first type with the shutter button, starting capture of the visual content;
detecting a user interaction of a second type with the shutter button during the capture of the visual content, the user interaction of the second type different from the user interaction of the first type; and
responsive to the user interaction of the second type with the shutter button during the capture of the visual content, canceling the capture of the visual content.

13. The method of claim 12, wherein:
the captured visual content is stored in the non-transitory, machine-readable storage media; and
to the method further comprises:
detecting a user interaction of a third type with the shutter button after the capture of the visual content;
responsive to the user interaction of the third type with the shutter button after the capture of the visual content, deleting the captured visual content from the non-transitory, machine-readable storage media.

14. The method of claim 13, wherein the captured visual content is deleted from the non-transitory, machine-readable storage media further based on the user interaction of the third type with the shutter button after the capture of the visual content being detected within a threshold duration of time after the capture of the visual content.

15. The method of claim 12, wherein:
the user interaction of the first type with the shutter button that starts the capture of the visual content includes a short-press of the shutter button; and
the user interaction of the second type with the shutter button during the capture of the visual content that cancels the capture of the visual content includes a long-press of the shutter button.

16. The method of claim 12, wherein:
the user interaction of the first type with the shutter button that starts the capture of the visual content includes a single-press of the shutter button; and
the user interaction of the second type with the shutter button during the capture of the visual content that cancels the capture of the visual content includes a multi-press of the shutter button.

17. The method of claim 12, wherein canceling the capture of the visual content includes:
stopping the capture of the visual content; and
deleting the captured visual content that has been stored in the non-transitory, machine-readable storage media.

18. The method of claim 12, wherein responsive to the user interaction of the first type with the shutter button that starts the capture of the visual content being detected when the image capture device is deactivated, the image capture device is activated to start the capture of the visual content.

19. The method of claim 18, wherein the image capture device being deactivated includes the image capture device being turned off or being in a standby mode.

20. The method of claim 18, wherein responsive to the user interaction of the second type with the shutter button during the capture of the visual content that cancels the capture of the visual content being detected following the user interaction of the first type with the shutter button that starts the capture of the visual content when the image capture device is deactivated, the image capture device is deactivated after the capture of the visual content is canceled.

* * * * *